(12) United States Patent  
Girardeau

(10) Patent No.: US 11,994,032 B2  
(45) Date of Patent: May 28, 2024

(54) ABRADABLE MEMBER FOR A TURBINE OF A TURBOMACHINE, COMPRISING A WEAR FACE PROVIDED WITH GUIDE VANES

(71) Applicant: SAFRAN AIRCRAFT ENGINES, Paris (FR)

(72) Inventor: Julian Nicolas Girardeau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/632,475

(22) PCT Filed: Jul. 31, 2020

(86) PCT No.: PCT/FR2020/051419  
§ 371 (c)(1),  
(2) Date: Feb. 2, 2022

(87) PCT Pub. No.: WO2021/023936  
PCT Pub. Date: Feb. 11, 2021

(65) Prior Publication Data  
US 2022/0275731 A1    Sep. 1, 2022

(30) Foreign Application Priority Data

Aug. 6, 2019 (FR) ...................................... 1909026

(51) Int. Cl.  
*F01D 11/12* (2006.01)  
*B33Y 80/00* (2015.01)

(52) U.S. Cl.  
CPC ............. *F01D 11/122* (2013.01); *B33Y 80/00* (2014.12); *F05D 2240/129* (2013.01); *F05D 2240/55* (2013.01); *F05D 2250/283* (2013.01)

(58) Field of Classification Search  
CPC .... F01D 11/001; F01D 11/122; F01D 11/127; F01D 9/042; F01D 9/044; F05D 2240/11; F05D 2240/12; F05D 2240/126; F05D 2240/129; F05D 2250/70–75  
See application file for complete search history.

(56) References Cited

U.S. PATENT DOCUMENTS

| | | | |
|---|---|---|---|
| 9,011,083 B2 * | 4/2015 | De Martino | F01D 11/001 415/173.3 |
| 10,837,301 B2 * | 11/2020 | Chun | F16J 15/447 |
| 11,319,826 B2 * | 5/2022 | Dominka | F01D 25/24 |

(Continued)

FOREIGN PATENT DOCUMENTS

| EP | 2 687 683 A2 | 1/2014 |
|---|---|---|
| EP | 3147460 A1 * | 3/2017 |
| EP | 3 190 267 A1 | 7/2017 |

OTHER PUBLICATIONS

International Search Report dated Jan. 27, 2021 in PCT/FR2020/051419 filed on July 31, 2020 (2 pages).

(Continued)

*Primary Examiner* — Brian P Wolcott  
(74) *Attorney, Agent, or Firm* — Oblon, McClelland, Maier & Neustadt, L.L.P.

(57) ABSTRACT

An abradable member for a turbomachine turbine, including a cellular structure including walls defining wells which open through a wear face. The cellular structure includes at least one flow straightener jutting from the wear face.

9 Claims, 4 Drawing Sheets

(56) References Cited

U.S. PATENT DOCUMENTS

| | | | |
|---|---|---|---|
| 11,585,230 B2* | 2/2023 | George | F16J 15/444 |
| 2013/0189107 A1* | 7/2013 | Krishnan | F01D 11/001 |
| | | | 416/193 R |
| 2014/0020403 A1* | 1/2014 | Tsukuda | F01D 11/02 |
| | | | 415/110 |
| 2017/0198597 A1 | 7/2017 | Chun | |
| 2017/0211407 A1* | 7/2017 | Chouhan | F01D 11/122 |

OTHER PUBLICATIONS

Preliminary French Search Report dated Apr. 3, 2020 in French Application 1909026 filed on Aug. 6, 2019 (1 page).

* cited by examiner

US 11,994,032 B2

ABRADABLE MEMBER FOR A TURBINE OF A TURBOMACHINE, COMPRISING A WEAR FACE PROVIDED WITH GUIDE VANES

TECHNICAL FIELD

The invention relates to an abradable member of a labyrinth seal provided to ensure sealing in a turbomachine turbine, between a member able to rotate and a fixed member, such as a bladed wheel and a stator casing surrounding that bladed wheel, or between a rotor member and a fixed bladed wheel such as a turbine stator surrounding that rotor member.

PRIOR ART

A turbine of a turbomachine such as a jet engine comprises a rotor bearing one or more series of radial blades surrounded by a stator portion, that turbine being rotationally driven by expansion of a gas passing through the blades of its rotor.

In such an arrangement there is a clearance, measured radially between the ends of the blades and the inside face of the stator that surrounds them, and which has a significant effect on the efficiency of the turbine because it allows the passage of gas around the bladed wheel. This gas constitutes a leakage flow because it passes around the bladed wheel without driving the blades.

Given in particular the differential expansions involved when the engine is in use, and which in part determine that clearance, the latter cannot be eliminated. The inside face of the stator is therefore covered by abradable members located immediately opposite the ends of the blades with the object of limiting the leakage flow.

These abradable members in general comprise a layer of material having a cellular structure of honeycomb type, that is to say forming radially extending wells, carried by a substrate.

In operation, the ends of the blades can rub against the abradable members to adjust this clearance to a minimal value. Because such rubbing can occur during operation, the radial clearance between the ends of the blades and the inside of the abradable members increases over time.

This radial clearance is an essential factor in relation to the efficiency of the turbine, since the rate of leakage flow depends upon it, that is to say the rate of flow of gas passing the turbine without driving its blades. Given that such a clearance cannot be completely eliminated, a leakage flow rate is necessarily present.

The object of the invention is to provide a solution to limit the effect of the leakage flow on the engine efficiency.

DISCLOSURE OF THE INVENTION

To that end, the invention is directed to an abradable member for a turbomachine turbine, comprising a cellular structure comprising walls defining wells which open through a wear face, characterized in that this layer with a cellular structure comprises at least one flow straightener jutting from the wear face.

With this solution, the leakage flow is straightened to bring its gyration to a value close to that of the main flow in order to facilitate its re-introduction into the main flow downstream of the abradable member, which enables the performance of the engine to be improved. As the straighteners are directly fastened into the cellular structure from which they jut, they benefit from appropriate mechanical strength properties in relation to the forces applied by the leakage flow that they straighten.

The invention also relates to an abradable member as defined, in which the cellular structure is obtained by additive manufacturing.

The invention also relates to an abradable member, in which the at least one flow straightener has a curved wall fastened to a well.

The invention also relates to an abradable member, comprising at least one series of flow straighteners disposed side by side to be aligned columnwise.

The invention also relates to an abradable member, in which the flow straighteners are identical and oriented in the same way.

The invention also relates to an abradable member as defined, in which the wells of the cellular structure are hexagonally based wells.

The invention also relates to a turbomachine turbine comprising a movable bladed wheel having blades provided with rubbing fins, surrounded by a stator member bearing at least one abradable member as defined.

The invention also relates to a turbomachine turbine comprising a fixed wheel having an inside sleeve surrounding a rotor member provided with rubbing fins, and in which that inside sleeve bears at least one abradable member as defined.

The invention also relates to a turbine as defined in which the flow straighteners are disposed downstream of the rubbing fins.

The invention also concerns a jet engine comprising a turbine as defined.

DETAILED DESCRIPTION OF SPECIFIC EMBODIMENTS

The idea behind the invention is to produce an abradable member by additive manufacturing, comprising a layer of cellular material incorporating flow straighteners jutting from the wear face of that cellular layer, to straighten the leakage flow. The leakage flow is thus straightened to bring its gyration to a value close to that of the main flow in order to facilitate its re-introduction into the main flow downstream of the abradable member to improve efficiency.

Figure 1:
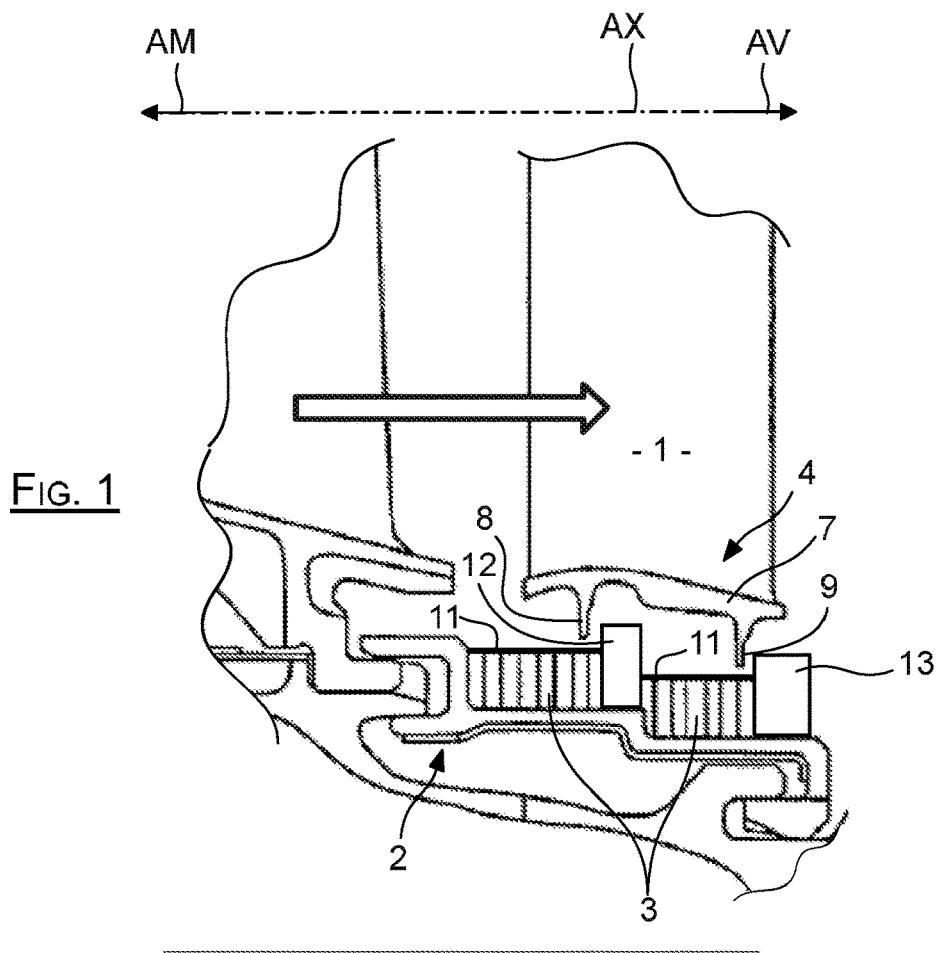
FIG. 1 is a view in longitudinal section of a portion of turbine equipped with an abradable member according to the invention.

A turbine of a turbomachine such as a jet engine, part of which is shown in FIG. 1, comprises a rotor bearing one or more series of radial blades 1 surrounded by a stator portion 2, the turbine being rotationally driven by expansion of a main flow of gas passing through the blades of its rotor.

The inside face of the stator 2 is covered by abradable members 3 located immediately opposite rubbing fins carried by the blades 1 of the rotor, in an arrangement constituting an abradable ring surrounding those blades.

Each end of the blade 1 comprises a protuberance 4 comprising a platform 7 bearing a first rubbing fin 8, and a second rubbing fin 9 located downstream AV of the first rubbing fin, the ends of these rubbing fins extending along the abradable members 3 when the turbine is in use.

Figure 3:
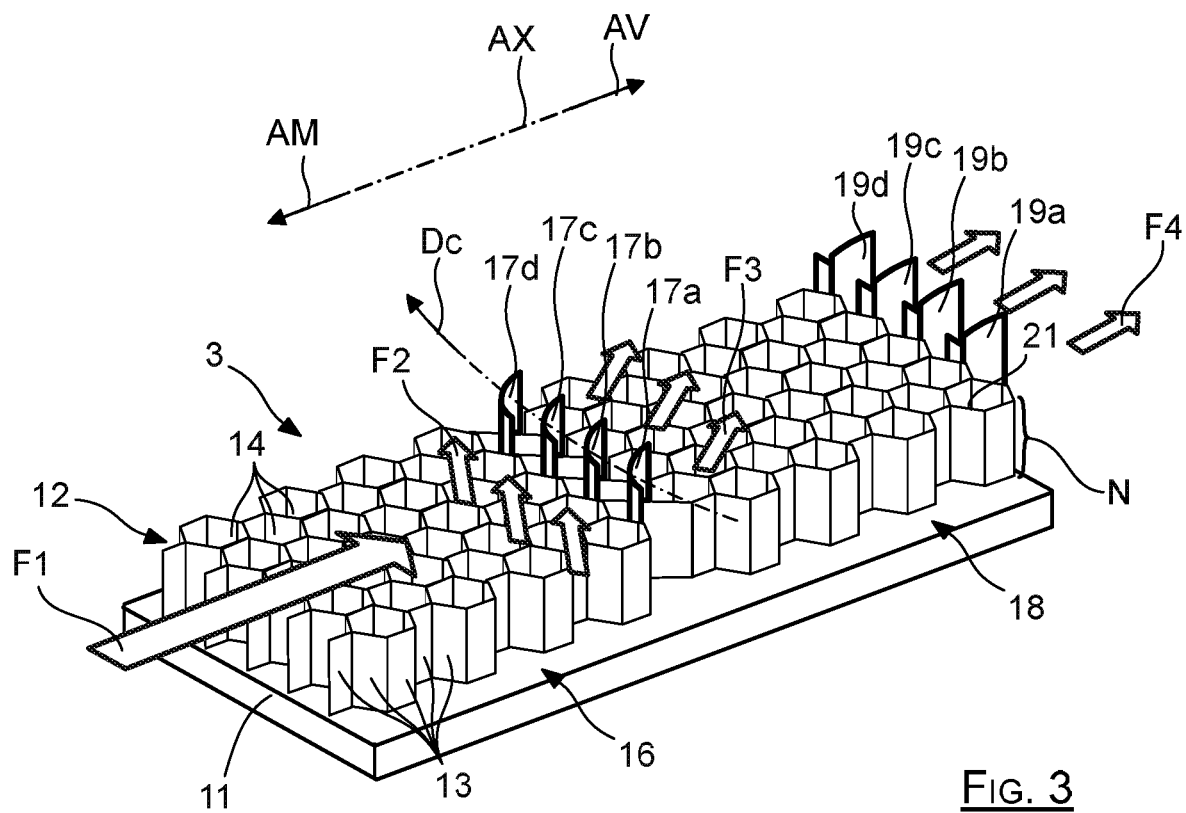
FIG. 3 is a perspective view of an abradable member according to the invention, shown alone.

The abradable member 3 which is more clearly apparent in FIG. 3 comprises a base 11, or plate, bearing a layer of cellular structure 12 of honeycomb type commonly called "Nida". This abradable member 3 is carried by a mounting of the stator. The abradable member 3 has a longitudinally oriented generally rectangular base: its long sides extending in the direction of the longitudinal axis AX of the engine, and its opposite short sides extending in a transverse direction denoted Dc. This transverse direction Dc is the circumferential direction corresponding to the circular path of the ends of the blades facing which the abradable member is mounted.

The layer with the a cellular structure 12 is a network of walls 13 extending perpendicularly to the base 11 in a repeating pattern which here is hexagonally based to delimit contiguous hexagonal wells 14 extending radially, that is to say perpendicularly to the base 11. Other basic patterns may be used such as a square, rectangular or diamond-shaped pattern or of any other appropriate shape.

That layer 12 comprises, successively along the axis AX: a first abradable portion 16; a first series of straighteners 17a-17d; a second abradable portion 18; and a second series of straighteners 19a-19d. The radially inside faces of the abradable portions 16 and 18 which are disposed facing the rubbing fins of the rotor constitute their wear faces 21. The wear face 21 is located at a distance from the base 11 which is the nominal thickness N of that layer 12, and the straighteners comprise active straightening parts which jut from that wear face by an emerged radial height E.

The first series comprises four straighteners 17a-17d disposed side by side columnwise in the transverse direction Dc while being positioned downstream of the first rubbing fin 8, and which extend beyond the wear face 21. The second series comprises four straighteners 19a-19d disposed side by side columnwise in the transverse direction Dc while being positioned downstream of the second rubbing fin 9, and which extend beyond the wear face 21.

Each series of straighteners is located downstream of a rubbing fin, in order to channel the leakage flow passing within the functional radial clearance that exists between the rubbing fins and the abradable material and which flows between the wear face 21 and the platform 7. These straighteners are arranged to straighten the leakage flow in order to reduce its gyration in order to bring it to a value close to that of the main flow in order to reduce the pressure losses resulting from its reintroduction into the main stream downstream of the abradable member. As can be seen in the drawings, the straighteners of each series are oriented in the same direction.

More particularly, and as illustrated in FIG. 3, the incident leakage flow at the location of the protuberance 4, represented by the arrow F1, is oriented in the longitudinal direction AX of the machine. When it encounters the first rubbing fin 8 while rotating, it is deviated laterally as illustrated by the arrows F2, such that this flow of gas then comprises a strong gyratory component after having passed the first rubbing fin 8. It is at this stage that it is channeled by the straighteners 17a-17d oriented to reduce its gyration, that is to say to re-orientate its flow in a direction closer to the axis AX, as illustrated by the arrows F3.

In similar manner, when the flow encounters the second rubbing fin 9, it again undergoes a deviation tending to increase its gyration. After having passed that second rubbing fin 9, it encounters the second series of straighteners 19a-19d which again straighten its direction of flow as close as possible to the axis AX, as represented by the arrows F4.

The fact of straightening the leakage flow enables its gyration to be significantly reduced to facilitate its re-introduction into the rest of the flow which has passed through the blades 1, and which also has weak gyration. The fact of facilitating the re-introduction of the leakage gases into the main stream, while reducing their gyration, provides a significant gain in the efficiency of the turbine.

Generally, it is preferable for the straighteners to be positioned downstream of the rubbing fins so as to be immediately opposite the blade platforms: in this zone of small passage cross-section, extending between the wear face and the platform, the leakage flow undergoes a jet effect making it possible to profit from high efficacy with the straighteners having a relatively small emerged radial height E.

As indicated above, the layer 12 is a network of walls constituting a repeating pattern forming hexagonal wells 14 of radial height corresponding to the nominal thickness N of that layer, which are contiguous perpendicular to the base 11 to conjointly delimit the wear face 21, and furthermore constituting a first and a second series of straighteners jutting from that wear face 21 by an emerged radial height E.

Figure 4:
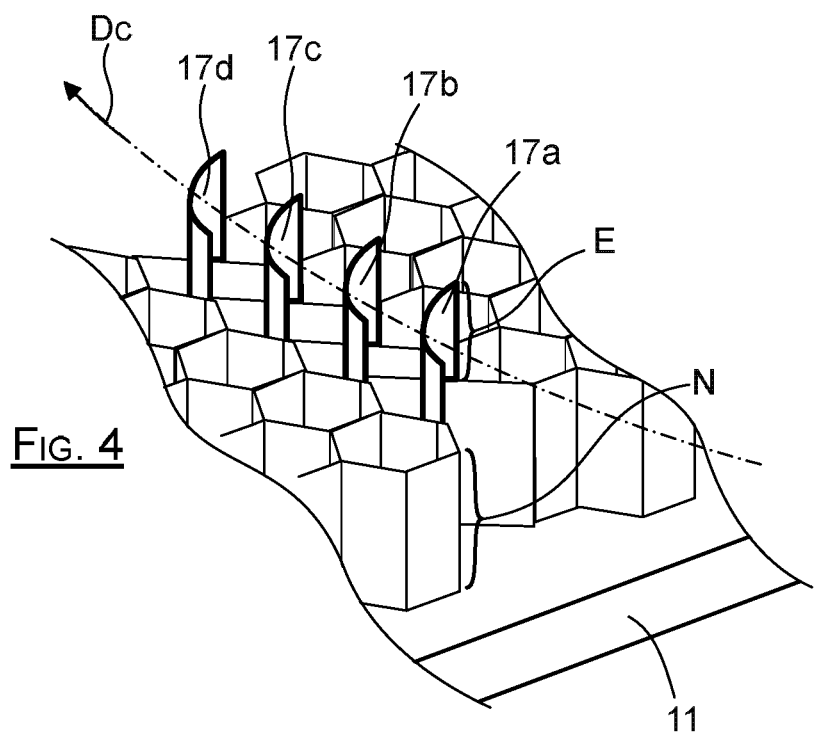
FIG. 4 is a perspective view showing a series of straighteners jutting from the wear face in the abradable member according to the invention.

As can be seen in FIGS. 3 and 4, each of the walls constituting a straightener 17a-17d, 19a-19d extends from the base 11 over the full nominal thickness N of the layer 12, that is to say over the full thickness of the wells 14, and juts from the wear face 21 by an emerged height E. The emerged portion of each straightener corresponds to its active part forming a deflector for straightening the flow of gas passing along the wear face 21.

Each straightener is fastened to one or more wells over the full height of those wells, to profit from anchorage in the cellular layer which is mechanically very robust. This anchorage over the full nominal thickness N enables each straightener to bear the mechanical stresses resulting from the flow of gas to which is subjected its active part jutting from the wear face 21.

The layer with a cellular structure 12 with the straighteners it comprises is obtained by additive manufacturing to combine the functions of cellular structure and of straightener in a single material. Additive manufacturing makes it possible to manufacture the complex forms of walls required by the implantation of the straighteners over the full nominal thickness N of the cellular structure for the purpose of improving its anchorage therein.

This additive manufacturing is for example provided by successive deposits of layers of metal powder melted by laser radiation to form the network of walls forming the layer 12. The straighteners are thus manufactured simultaneously with the honeycomb structure by stratification for example directly on the base 11. The additive manufacturing thus makes it possible conjointly to obtain cells providing mechanical robustness and enabling acoustic waves to be absorbed, and stiffeners making it possible to reduce the losses of efficiency due to the leakage flows.

Figure 2:
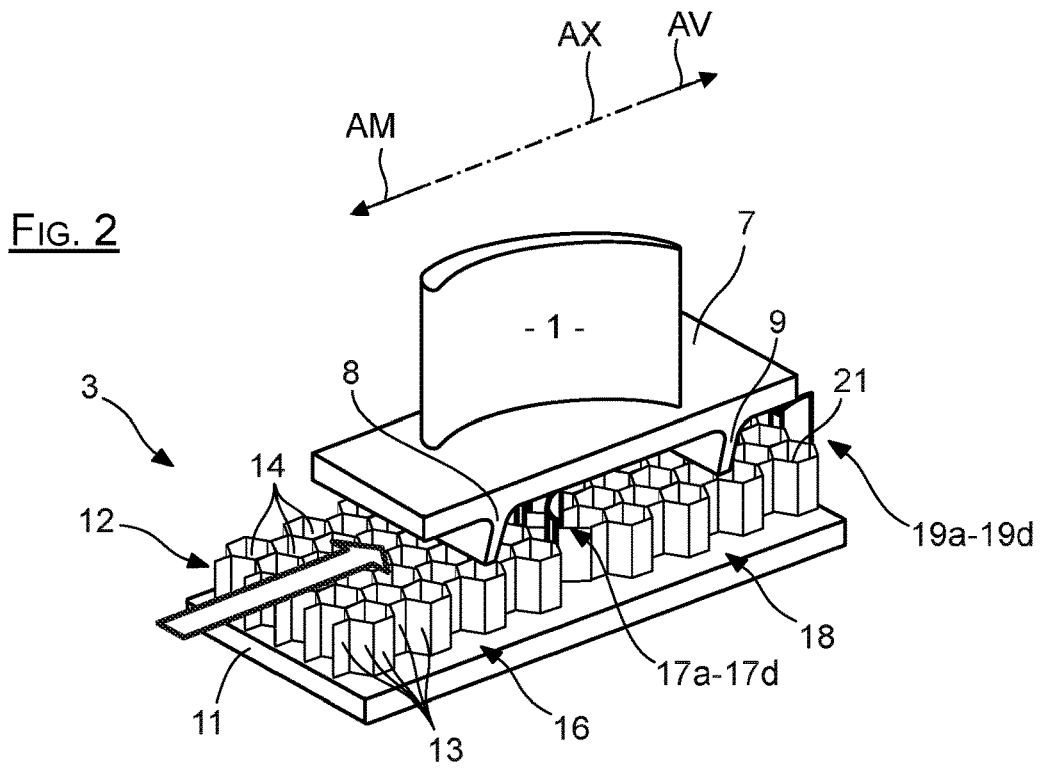
FIG. 2 is a perspective view showing an abradable member according to the invention facing a blade protuberance.

As regards the design of the straighteners, these are provided with an appropriate curvature to ensure the straightening of the leakage flow in the general direction of gas flow. As can be seen in FIG. 3, each straightener 17a-17d and 19a-19d is formed by a wall extending perpendicularly to the base while being curved so as to present a leading edge forming a so-called entry angle with the direction AX, and a trailing edge forming a smaller so-called exit angle with the direction AX. In the example of FIGS. 2 to 4, the entry angle is of the order of 60° and the exit angle is of the order of 10°. This difference between the entry angle and the exit angle which are measured in the plane of the wear face 21 corresponds to the gas flow straightening angle, that is to say to the reduction in the gyration provided by the straighteners. More generally, the entry angle is comprised between 30° and 90°, and the exit angle is comprised between 0° and 30° in the case of an abradable member surrounding the blades of the rotor.

As can be seen in FIG. 3, the straighteners 17a-17d of the first series have entry and exit angles that are greater than for the straighteners 19a-19d of the second series. This corresponds to the fact that the first straighteners are confronted with the incident flow which, after having passed the first rubbing fin, has the greatest gyration. After having been straightened, the gyration of the leakage flow is reduced, such that the straighteners of the second series have a smaller entry angle and exit angle.

In practice, the dimensions, the shapes and the curvatures of the straighteners are designed as a function of the operating conditions of the turbine for its nominal regime, so as to bring the gyration of the leakage flow to a value close to that of the main flow.

Figure 5:
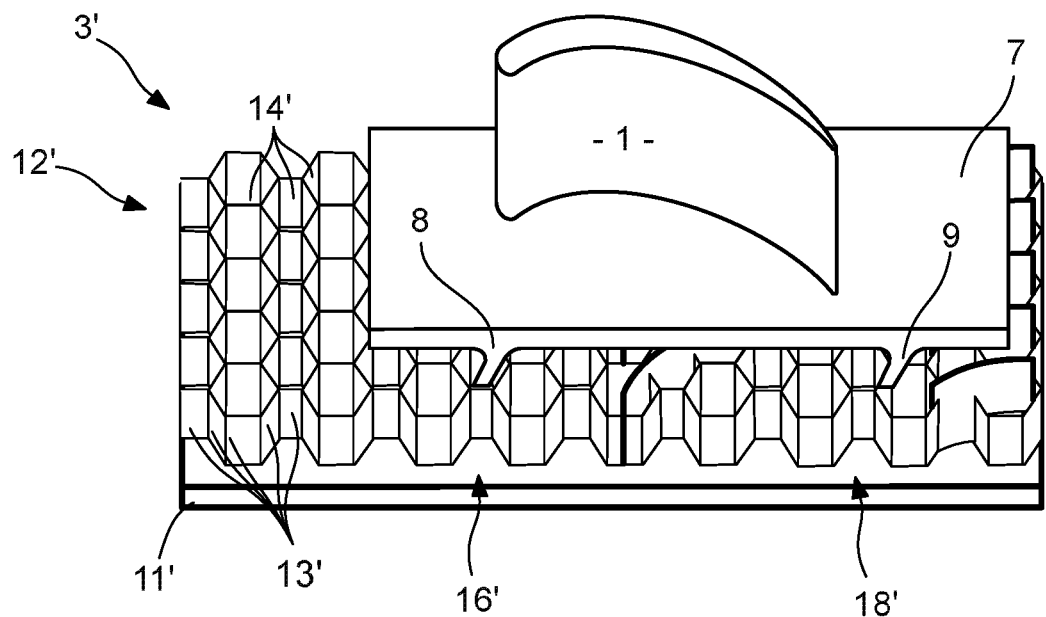
FIG. 5 is a perspective view showing an abradable member according to a variant of the invention facing a blade protuberance.
Figure 6:
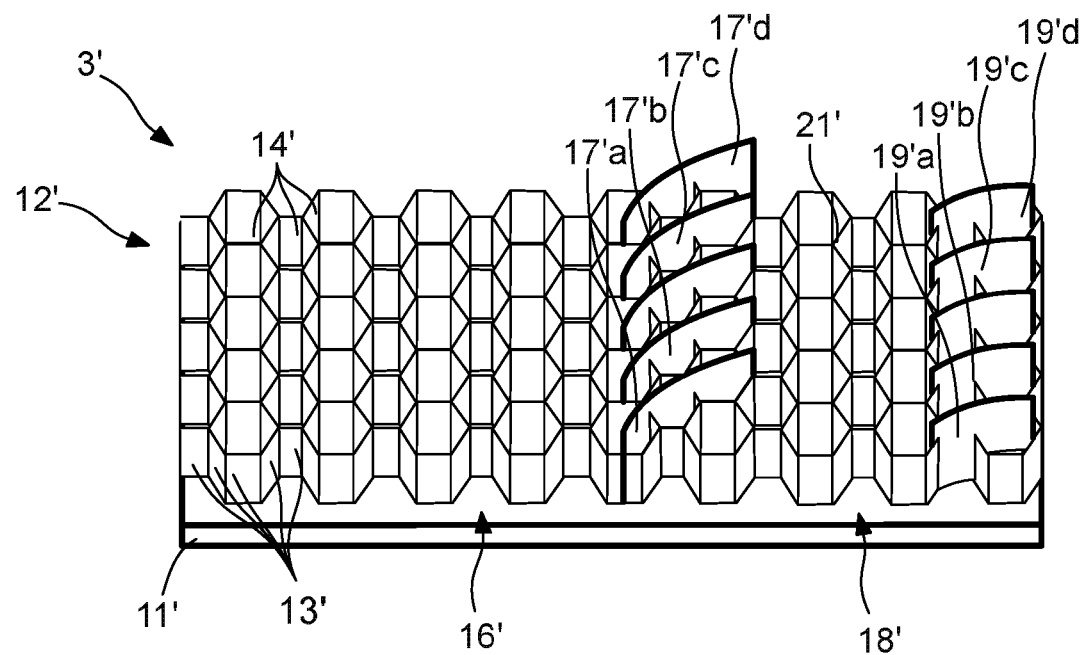
FIG. 6 is a perspective view of an abradable member according to a variant of the invention, shown alone.

Thus, in the embodiment of FIGS. 5 and 6, two series of straighteners have also been provided, but of which the shapes differ substantially from those of the example of FIGS. 2 to 4, these straighteners in particular having a greater length along the axis AX.

The abradable member of FIGS. 5 and 6 has the same general structure as that of FIGS. 2 to 4. It is for this reason that the components are identified with the same references is those for FIGS. 2 to 4, but to which the "prime" symbol has been added. This other abradable member 3' thus comprises a base 11', bearing a layer 12' with a cellular structure, formed by a network of walls 13' delimiting hexagonal wells 14' and having a nominal thickness N. This layer 12' too comprises a first abradable portion 16' of nominal thickness N, a first series of straighteners 17'a-17'd, followed by a second abradable portion 18' of nominal thickness N, itself followed along the axis AX by a second series of straighteners 19'a-19'd.

As can be seen more particularly in FIG. 6, the straighteners 17'a-17'd and 19'a-19'd have active parts jutting from the wear face 21' which have greater lengths along the axis AX than the straighteners of the example in FIGS. 2 to 5. They moreover have smaller curvatures, which generally corresponds to straightening of less amplitude than in the example of FIGS. 2 to 5.

Moreover, in the example for FIGS. 1 to 6, the abradable member according to the invention equips a stator surrounding a movable bladed wheel. Yet the invention applies just as well to the case of an abradable member carried by an inside sleeve of a fixed bladed wheel surrounding a rotor provided with rubbing fins.

Figure 7:
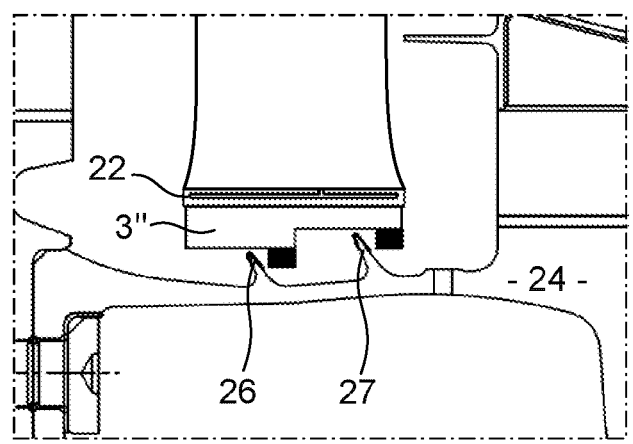
FIG. 7 is a view in longitudinal section showing an arrangement in which an abradable member according to the invention equips a rotor member surrounded by a turbine stator.

Thus, in the example of FIG. 7, the abradable member provides sealing between an inside sleeve 22 of a fixed wheel and a rotor 24 surrounded by that sleeve. In similar manner to the case in FIG. 1, the rotor comprises a sealing ring provided with rubbing fins 26, 27 which are located facing the abradable member according to the invention, identified by 3". This abradable member comprises, as in the case of the abradable members 3 and 3', a base bearing a layer of cellular material incorporating two series of straighteners located downstream of the rubbing fins 26 and 27, to straighten the leakage flow passing between the rubbing fins and the wear face of that abradable member.

The invention claimed is:

1. An abradable member for a turbomachine turbine, comprising:
   a cellular structure comprising walls defining wells which open through a wear face,
   wherein the cellular structure comprises at least one flow straightener jutting from the wear face,
   wherein the at least one flow straightener has a curved wall fastened to a well, and
   wherein the curved wall extends perpendicularly to the well and presents an entry angle and an exit angle with respect to a longitudinal direction of the turbomachine turbine, the entry angle being greater than the exit angle.

2. The abradable member according to claim 1, wherein the cellular structure is obtained by additive manufacture.

3. The abradable member according to claim 1, wherein the at least one flow straightener includes at least one series of flow straighteners disposed side by side to be aligned columnwise.

4. The abradable member according to claim 3, wherein all flow straighteners of the at least one series of flow straighteners are identical and oriented in a same way.

5. The abradable member according to claim 1, wherein the wells of the cellular structure are hexagonally based wells.

6. A ttubomachine turbine comprising:
   a movable bladed wheel having blades provided with nibbing fins, surrounded by a stator including at least one abradable member according to claim 1.

7. A turbomachine turbine comprising:
   a fixed wheel comprising an inside sleeve surrounding a rotor member provided with rubbing fins,
   wherein the inside sleeve includes at least one abradable member according to claim 1.

8. A turbine according to claim 6, wherein the at least one flow straightener is disposed downstream of the nibbing fins.

9. A jet engine comprising a turbine according to claim 6.

* * * * *